(12) United States Patent
Jiang et al.

(10) Patent No.: US 7,460,483 B2
(45) Date of Patent: Dec. 2, 2008

(54) SYSTEM AND METHOD FOR MANAGING PERFORMANCE OF COMMUNICATION LINES OF A COMMUNICATION NETWORK

(75) Inventors: Baofeng Jiang, Pleasanton, CA (US); Michael Lim, Fremont, CA (US); Mo Katibeh, Houston, TX (US); Robert Michetich, Houston, TX (US); Juan G. Flores, Peculiar, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 400 days.

(21) Appl. No.: 11/388,874

(22) Filed: Mar. 24, 2006

(65) Prior Publication Data

US 2007/0223568 A1    Sep. 27, 2007

(51) Int. Cl.
*G06F 11/00* (2006.01)
*H04B 7/00* (2006.01)

(52) U.S. Cl. .................. 370/241; 370/242; 370/252; 370/352; 714/25; 455/428

(58) Field of Classification Search .............. 370/252, 370/253, 241, 242, 352, 356, 241.1; 375/225; 379/9.03, 130, 100.05, 100.06; 714/4, 25, 714/27, 43; 455/428; 705/1, 8, 9
See application file for complete search history.

(56) References Cited

U.S. PATENT DOCUMENTS

| | | | |
|---|---|---|---|
| 4,517,468 A | 5/1985 | Kemper et al. | |
| 4,972,453 A | 11/1990 | Daniel, III et al. | |
| 6,556,659 B1 | 4/2003 | Bowman-Amuah | |
| 6,636,585 B2 | 10/2003 | Salzberg et al. | |
| 6,763,333 B2 * | 7/2004 | Jones et al. | 705/8 |
| 6,901,530 B2 * | 5/2005 | Cerami et al. | 714/4 |
| 6,910,187 B2 | 6/2005 | Felkey et al. | |
| 7,027,405 B1 | 4/2006 | Khadavi | |
| 2002/0161667 A1 | 10/2002 | Felkey et al. | |
| 2004/0210469 A1 | 10/2004 | Jones et al. | |

OTHER PUBLICATIONS

International Search Report, International Patent Application No. PCT/US2007/064798, mailed Aug. 5, 2008, 3 pages.
Written Opinion of the International Searching Authority, International Patent Application No. PCT/US2007/064798, mailed Aug. 5, 2008, 3 pages.

\* cited by examiner

*Primary Examiner*—Afsar M. Qureshi
(74) *Attorney, Agent, or Firm*—Jackson Walker L.L.P.

(57) ABSTRACT

A method and system for managing performance data of communication lines, such as digital subscriber lines, is disclosed. The method includes receiving from a remote user device an identifier for a particular communications line at a web server; initiating a real-time performance analysis of the line at a network end of the line; receiving real-time performance data and converting the real time performance data to analyzed data; receiving field performance data from the user device; and converting at least one of the field performance data and the real-time performance data from a web-based format to a mainframe format; and sending the converted data to a mainframe for storage corresponding to a file associated with the identifier.

16 Claims, 7 Drawing Sheets

SYSTEM AND METHOD FOR MANAGING PERFORMANCE OF COMMUNICATION LINES OF A COMMUNICATION NETWORK

FIELD OF THE DISCLOSURE

The present disclosure relates to performance of data communication lines in communication networks.

BACKGROUND

Trouble ticket and work flow administration systems for telecommunication services, such as DSL service (DSL, ADSL, VDSL, etc.) use mainframe computer-based file systems to compile data for management of trouble tickets relating to data communication lines (such as Digital Subscriber Lines (DSL Lines or DSL Links)) that connect network elements, such as switches at wire centers or central offices, to customer premises equipment, such as DSL modems. Each new trouble with the DSL service for a line typically results in the creation of a trouble ticket that has a unique identification number. A single file is typically associated with each trouble ticket. In a typical network, there may be several mainframe system locations of an Internet Service Provider (ISP) that handle trouble tickets for the network. Each central office typically has several switches, each switch connecting to several hundred customer DSL lines via a dedicated port for each such line. In the mainframe-based systems, each client or user, such as a service personnel of an ISP, is provided a graphical user interface (GUI) that the user can use to access a mainframe or backend system. A GUI typically uses a prompt response format. Upon receiving a user command for a particular line, the backend system retrieves the file relating to the trouble ticket for that line and sends it to the user. It typically takes several screen navigation and key strokes to read from the file. Also, field technicians typically do not have GUI interface. Technicians typically use handheld test devices to test the line at the customer end to gather performance data and convey the performance data and other information to the GUI users over telephone. The field test results are then sent to the appropriate mainframes by the GUI user, which can require multiple manual entries.

Additionally, field technicians typically do not have the ability to remotely cause network elements, such as DSLAMs and metallic line testers, to take new or real-time performance data for a line while at a customer premises or another remote location. Field personnel also generally do not have access to the real-time performance data or the historical data for evaluating and troubleshooting the line. Thus, there is a need for an improved system for accessing new and historical line performance data and for communicating the field test results to the backend systems, such as the mainframes.

BRIEF DESCRIPTION OF THE DRAWINGS

For detailed understanding of the present disclosure, references should be made to the following detailed description of the embodiments, taken in conjunction with the accompanying drawings, in which like elements have been given like numerals, and wherein.

DETAILED DESCRIPTION OF THE DRAWINGS

Figure 1:
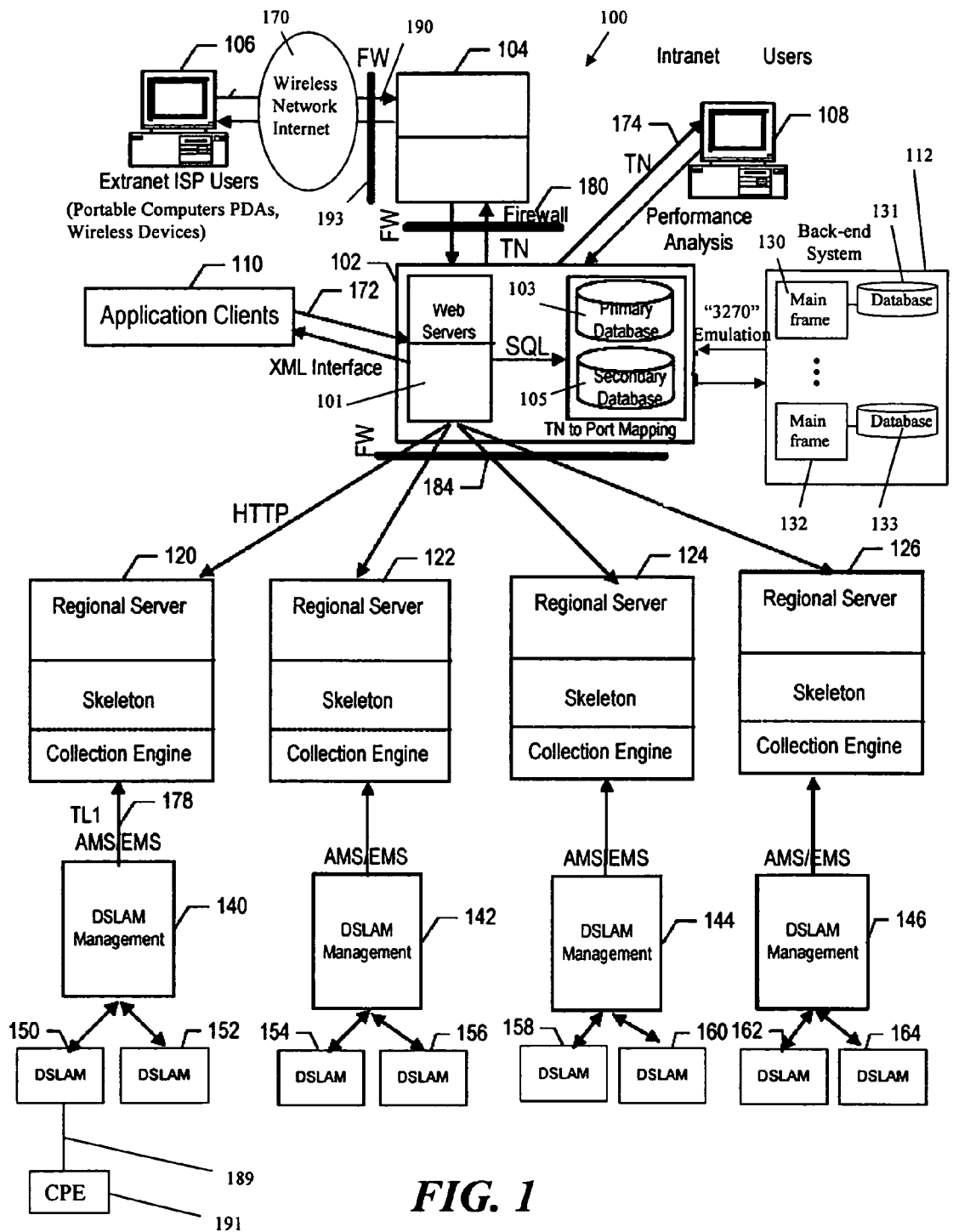
FIG. 1 is a block diagram of an embodiment of a web-based DSL line management system for accessing DSL line performance data and for providing field test data to a backend system.

FIG. 1 shows a system 100 for managing performance of digital subscriber lines of a communications network, including initiating real-time collection of digital subscriber line performance data by a remote device via a wireless network or the Internet, accessing such data in the field and providing field test data and other information for the lines to a backend system that manages trouble ticket information for the lines. The system 100 has an extranet user interface via a wireless network and/or the Internet 170. The system 100 includes a first server, such as a resource center web server 104 having an input 190 with respect to an extranet user device 106 (also referred to as the user), such as a portable computer, PDA, etc. The system also includes a second web server 102, that among other things can map a digital subscriber line identifier or telephone number to a port associated with providing a service to the line and a plurality of regional servers 120, 122, 124, 126. The identifier may also be an Internet Protocol address or a CPE identifier, such as a DSL modem number. The system 100 further includes a plurality of digital subscriber line access multiplexer (DSLAM) management units 140, 142, 144, 146. Each of the DSLAM management units is coupled to a plurality of DSLAM equipment units, such as DSLAM equipment 150-164, as illustrated. In a particular embodiment, the DSLAM equipment supports a plurality of digital subscriber line broadband communication links or lines, such as line 189, to customer premises equipment (CPE) 191. The DSL links supported by the DSLAMs typically cover a diverse geographical areas, such as across many states. For example, the particular illustrated system may include several thousand DSLAMs covering several million ADSL lines across several different states.

The line identifier or telephone number (TN) to port mapping server 102 is coupled to the resource center server 104 via an intermediate firewall 180. The resource center web server 104 is coupled to the extranet ISP user system 106 via a firewall 193. The resource center web server 104 provides performance analysis data that may be displayed on the extranet ISP user device 106 via system 170. The port mapping server 102 includes logic to provide an extensible markup language (XML) interface 172 to external application clients 110. The server 102 also provides a telephone number interface 174 and access to performance analysis to the intranet users 108. The port mapping server 102 includes web servers 101 and has access to a primary database 103 and secondary database 105 to perform the telephone number to port mapping and other performance analysis functions. An example database is implemented as an SQL type database. Server 102 is coupled to the regional servers 120 to 126 via firewall 184. Each of the regional servers 120-126 includes skeleton code and data collection engine. Each regional server is coupled to a respective DSLAM management module via a communication line, such as TL1 line, labeled 178.

Figure 2:
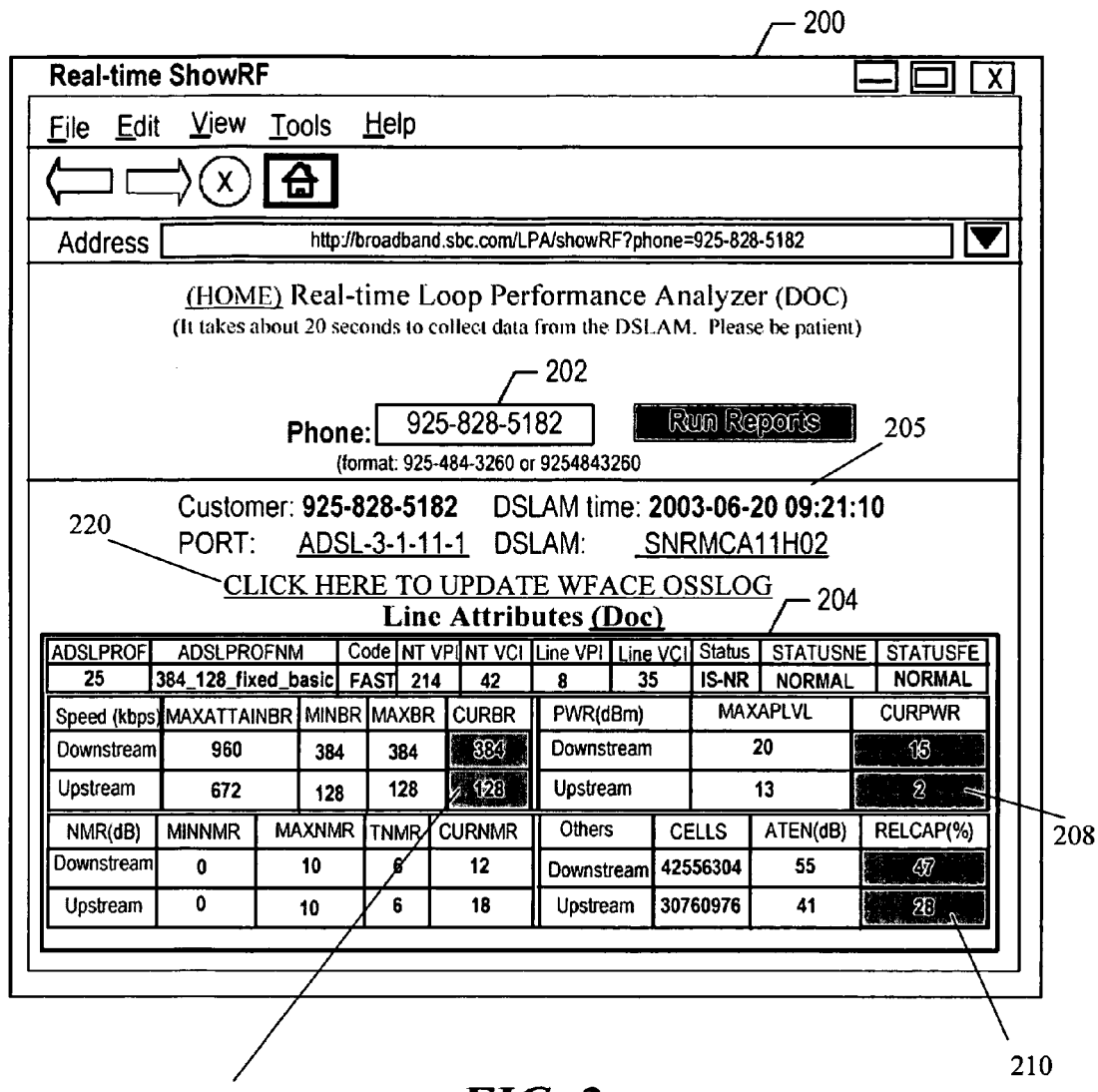
FIG. 2 is an example of a screenshot that illustrates a web portal provided to a user device and line performance data that may be displayed on the user device.

During system operation, an ISP personnel logs on via the network 170, for example using GPRS (General Packet Radio Service) wireless network and VPN (Virtual Private Network) to access the server 104 across firewall 193. The web server 104 then provides a web portal to the user device 106. An example of the web portal is shown in FIG. 2. The ISP personnel inputs an identifier, such as a telephone number 202 (FIG. 2) that is received at the resource center web server 104 from the extranet ISP user device 106. The telephone number is then passed to the server 102 across firewall 180 and is received at the web server 101, which may include a stub server. The web server 102 performs a database query such as an SQL query to the database units which perform telephone number to port mapping. The DSL multiplexer address port corresponding to the particular telephone number received is then provided by the database to logic within a stub portion of the server 102.

The port address is then provided across firewall 184 to the designated regional server that supports a particular DSLAM having the selected port address. The port address is provided to the appropriate regional server and the regional server then communicates the port address across the communication link to the respective DSLAM management unit. For example, where the selected regional server that supports the DSLAM matching a DSL line having the input telephone number is regional server 120, the port address is then provided to the DSLAM management unit 140 which then performs real-time data collection of the performance of the associated DSL line, such as a DSL line 189, supported by DSLAM 150. In one aspect, the real-time performance may be done by DSLAM at the network end according to programmed instructions and/or by other test devices, such as metallic loop testers connected to the network end. After the performance tests are performed and real time data for the DSL line with the selected port address is collected at the DSLAM unit, the collected data is received at the collection engine within the regional server 120 and is passed back to the server 102 for reporting to the appropriate user. In one aspect, the raw data collected from regional server 120 is processed by performance analysis tools associated with the server 102. The resulting processed and analyzed data is reported to application clients 110, intranet users 108 and/or extranet ISP users 106.

Still referring to FIG. 1, the server 102 is shown coupled to a backend system 112 that includes a plurality of mainframe systems 130 and 132, each respectively having an associated database 131 and 133. The mainframe systems may be located in diverse geographical regions of the ISP and manage trouble ticket data for the DSL lines of the network 100. The web server 102 communicates or interfaces with each of the mainframe systems in the backend system 112 via an appropriate emulator, such as "3270" emulator. The "3270" emulator allows connection of the web server 102 with the mainframes systems via TCP/IP. It can also support web services via XML. When a trouble is reported on a particular DSL line, a trouble ticket is generated corresponding to the identifier or telephone number associated with the affected line. A single file typically is associated with the trouble ticket. A particular mainframe system in the backend system 112 maintains the trouble ticket data for the line. In general each mainframe system maintains trouble ticket data for a large set of DSL lines, generally for selected geographical regions. Each DSL line corresponds to a particular node of a large number of nodes in the backend system for properly routing data for the line to the appropriate mainframe system.

Still referring to FIG. 1, the web server 102 includes an authentication component that enables the server 102 to authenticate itself to all of the nodes in the backend system, even when different nodes may require a different way for identification. Also, the web server 102 includes a communication component that enables it to remain in communication with all of the geographically dispersed nodes comprising the backend system of records. The web server 102 also may employ a method of injecting timely traffic on the communication channels on all nodes to allow these channels to persist indefinitely, whereas in the course of normal usage by ISP operators, such communication channels could be discarded by the nodes after a certain time period. The web server 102 also may include a time-sharing mechanism that allows the system to aggregate a large number of updates that may be concurrently performed by various field personnel.

The user 106 often performs one or more tests at the customer end on the DSL line and the CPE, such as a DSL modem. The user also often collects performance data that is stored in the CPE. Additionally, the user may draw certain conclusions relating to the performance and condition of the DSL line and the CPE. The server 102 or 104 provides to the user a screenshot where the user can enter such data and information and send back such data to the server 102 via the network 170. An example of a screenshot that may be provided to the user to enter and report back the field data is shown and described in reference to FIG. 5.

When the user sends the line performance data from the field via the network 170, the server 102 converts this web-based collected data to a mainframe format and sends the converted data to the node in the backend system that is associated with the DSL line. The sent data may include the field performance data, real-time performance data and historical data for the line. The backend system then sends the received data to the appropriate mainframe system that stores the data in the trouble ticket file of the line or in another suitable file.

In one aspect, after the web-based system has captured the DSL performance data or metrics and a decision is made to update the backend system of record for work assignment and control administration, the DSL performance metrics are automatically transferred to perform the update. The web system 103 also is capable of merging any additional information provided by the field technician into the record to be updated. Also, the identifier information for the DSL line being tested is transferred over to the record that is to be updated. Based on the identifier information for the DSL line, system 102 automatically determines the node within the backend system of record to be updated. The system 102 then simulates the keystrokes and other entries normally performed by an operator to locate the record to be updated within the backend system, and verifies the responses from the backend system to ascertain that the correct record was retrieved. The system then simulates the keystrokes and entries to enter the DSL performance metrics and the field technician's additional information to the appropriate node within the backend system. The system then inserts the appropriate code required by the backend system of record to propagate the update to various dependent subsystems.

Thus, in one aspect, the web server 102 integrates the web-based DSL line performance and associated data and the distributed data of a network-wide backend system of records by simulating the keystrokes and data entry inputs used for such operations and verifying responses from the backend.

An example of a screenshot 200 of a portal and a DSL performance report that may be provided to a user of the system described in FIG. 1, is shown in FIG. 2. When a user, such as user 106, logs onto the server 104 (FIG. 1), the user receives the screenshot shown in FIG. 2. The user enters the DSL line identifier, such as telephone number 202, and receives the real-time performance data shown under "Line Attributes" 204 along with the port and DSLAM identifications 205. The performance data may include any data, including bit rate (current bit rate) 206, current power 208 and attenuation 210. A color code or other identifier may be provided to indicate a level of performance. For example, a color green may indicate an acceptable level of a parameter wherein color red may indicate an unacceptable level. The user 106 may click on line 220 to send the data to the server 104 to update the backend records.

Figure 3:
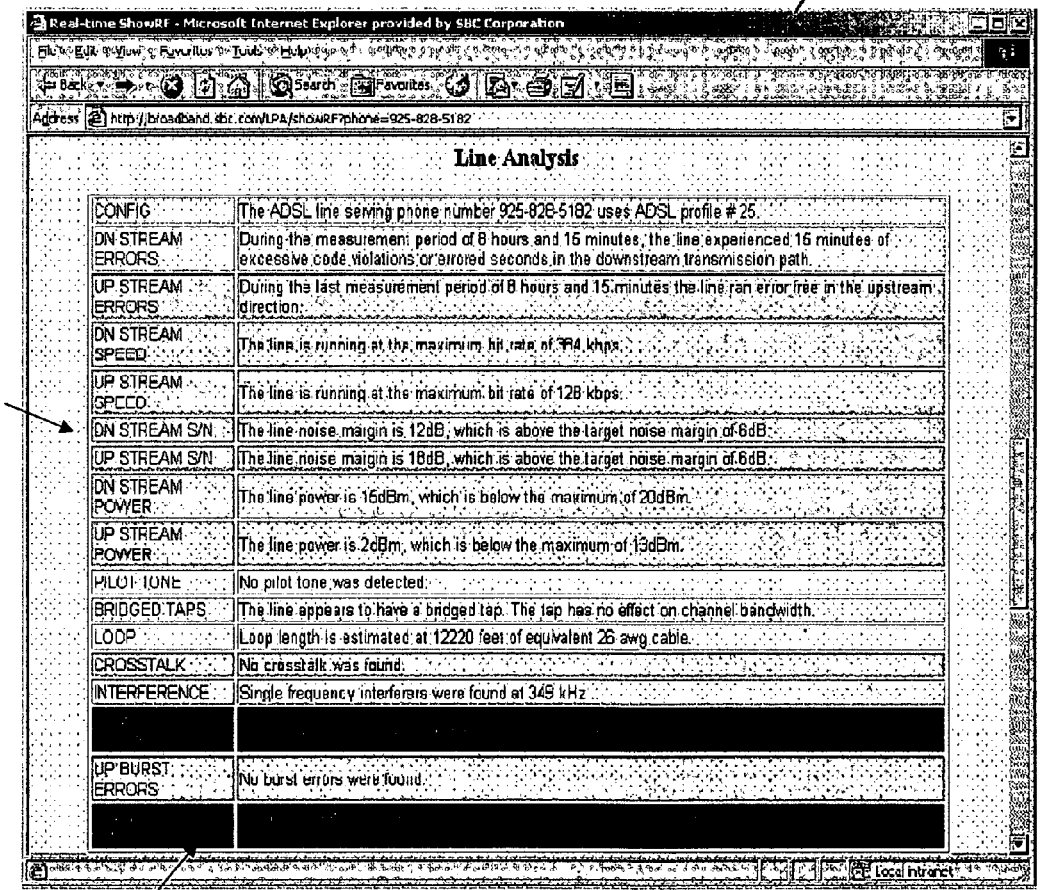
FIG. 3 is an example of a screenshot of a line analysis for display.

Referring to FIG. 3, another illustrative screenshot report 300 is shown. The report 300 is a DSL line analysis report that includes DSL parameters such as the particular ADSL line telephone number, downstream and upstream speed, downstream and upstream bit errors as well as other testing parameters, such as loop length, bridge taps, and pilot tone. Items shown in one color, for example 302, indicate acceptable performance while items shown in a different color, for example 304, indicate unacceptable values.

Figure 4:
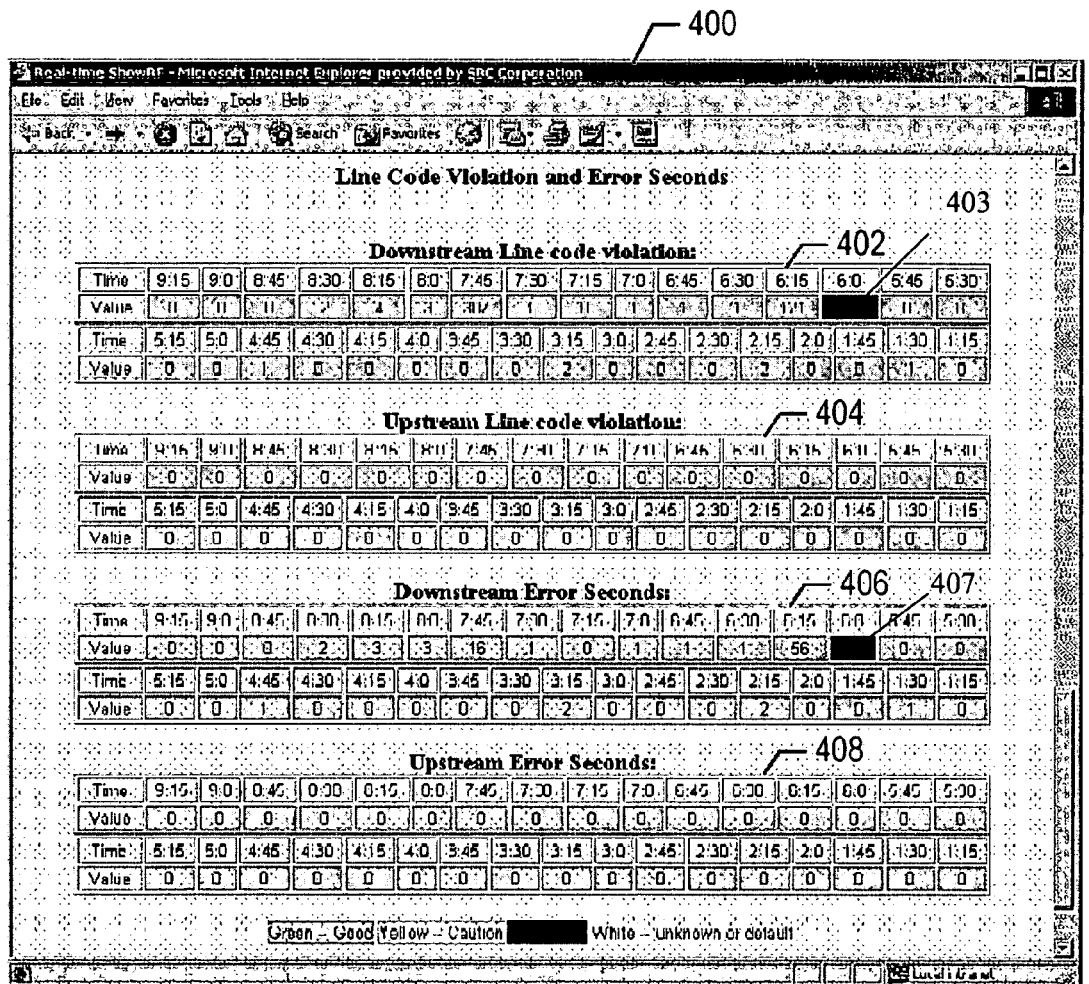
FIG. 4 is an example of a screenshot of line code violation data for display.

Referring to FIG. 4, another illustrative report 400 is shown. The report 400 illustrates DSL line code violations and error seconds rates. The line code violations and error seconds report includes downstream line code violations 402, upstream line code violations 404, downstream error seconds 406, and upstream error seconds 408. A color code or other identifier may be provided to indicate a level of performance of a line code value. For example, a color red, such as 403 and 407, may be used to indicate a bad line code value.

Figure 5:
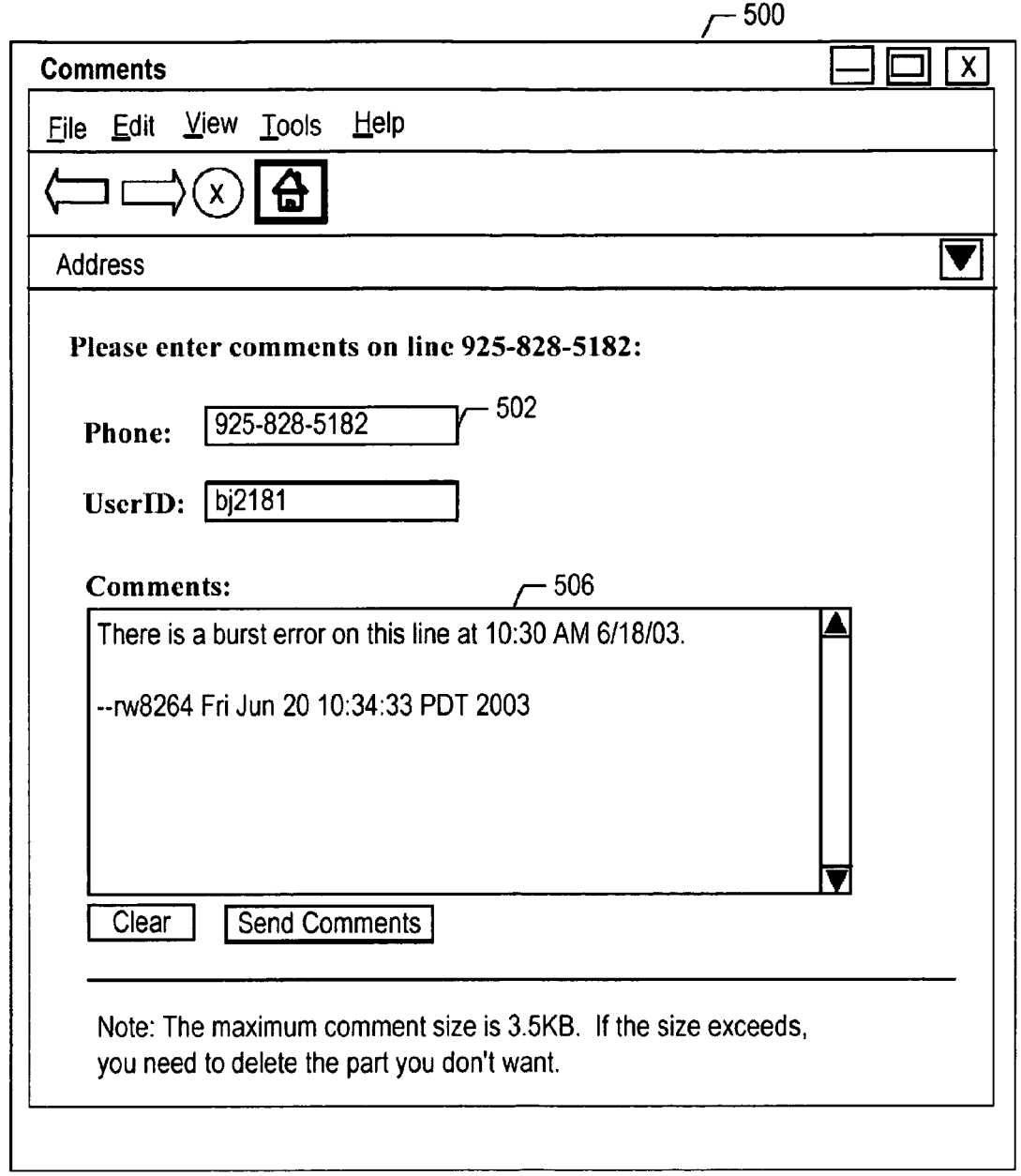
FIG. 5 is an example of a diagram of an input screen for a user to send field performance data and other information to the web servers in the system of FIG. 1.

Referring to FIG. 5, an input screen is shown that may be provided to a user interface, such as the ISP user interface 106. A particular input screen allows an operator to enter a telephone number and user ID into the system and to provide text on a particular line condition. For example, an operations technician may identify a particular error on a DSL line, such as the indicated burst error 506 with respect to the telephone number 502.

Figure 6:
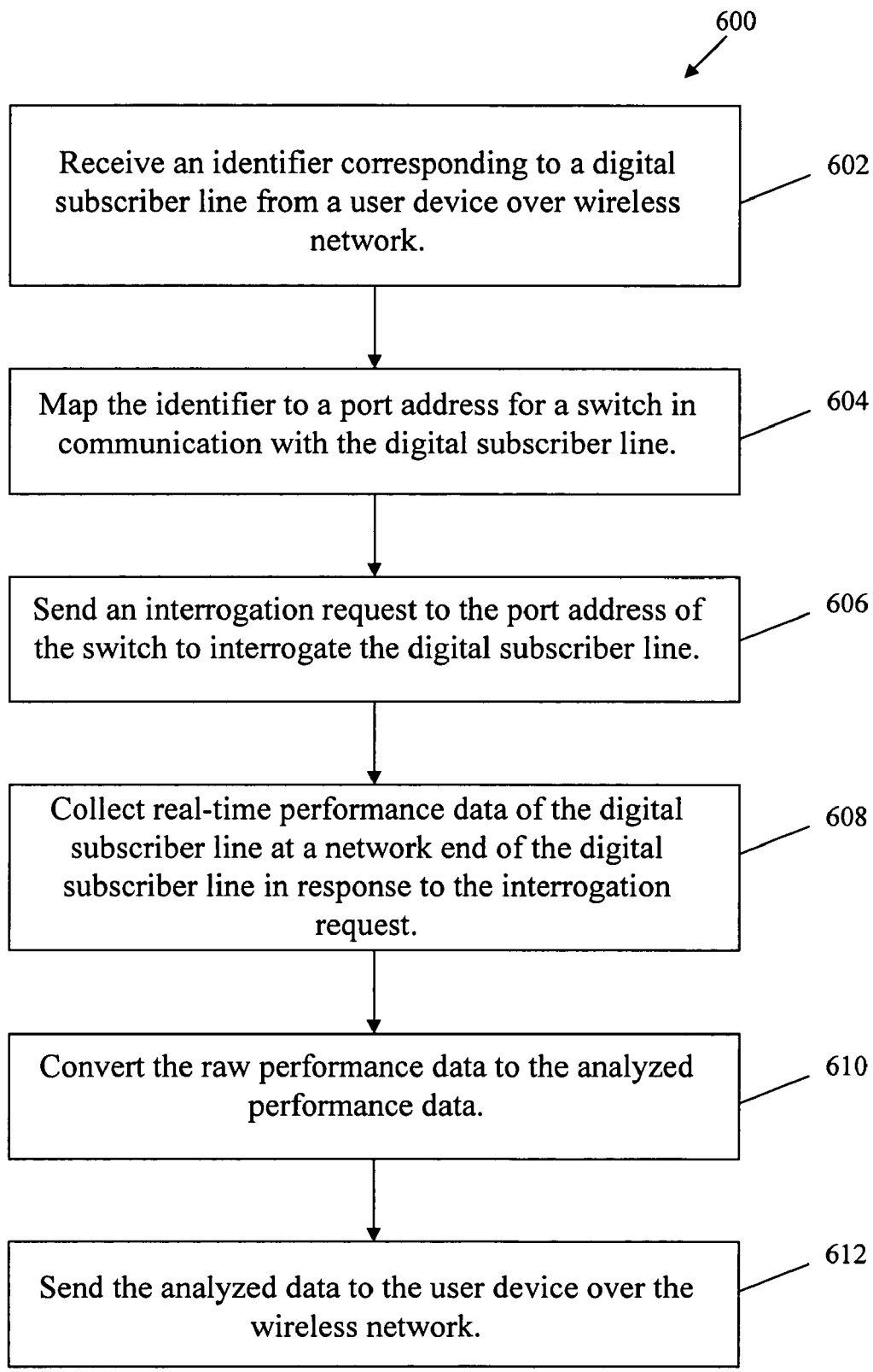
FIG. 6 is a flowchart that illustrates a particular embodiment of a method of accessing DSL data and for sending field test results to a backend system.

Referring to FIG. 6, a particular illustrative method of operation for the system of FIG. 1 is shown. In Box 602, an identifier is received that corresponds to a digital subscriber line from a user device over a wireless network. The identifier is mapped to a port address for a switch in communication with the digital subscriber line (Box 604). An interrogation request is then sent to the port address of the switch in order to interrogate the digital subscriber line (Box 606). In response to the interrogation request, real-time performance data of the digital subscriber line is collected (Box 608) at a network end of the digital subscriber line. In Box 610, the collected raw performance data is converted to analyzed performance data, and the analyzed data is sent to the user device over the wireless network (Box 612).

As described above, the disclosure in one aspect provides a computer-readable medium accessible to a server for executing instructions contained in a computer program embedded in the computer-readable medium, wherein the computer program includes: instructions to receive an identifier for a digital subscriber line from a user device over a wireless network; instructions to map the identifier to a port address of a switch, in data communication with the digital subscriber line; instructions to send a request to interrogate the port to collect real-time performance data for the digital subscriber line; instructions to collect the real-time performance data for the digital subscriber line at a network end of the digital subscriber line in response to the interrogation request; instructions to convert the real-time performance data to analyzed performance data; and instructions to transmit the analyzed data performance data to the user device over the wireless network. The computer program further includes instructions to send a web portal or browser to the user device and instructions to receive the identifier as an input to the web portal. The computer program also includes instructions to receive field performance data of the digital subscriber line performed at a customer end via the web portal over the wireless network. The computer program further includes instructions to send the analyzed data and the field performance data of the digital subscriber line to a backend system for storage corresponding to a trouble ticket associated with the identifier. In one aspect, the collection and analysis of the real-time performance data and the collection of the field performance data is done based on web-based system. Additionally, the computer program includes instructions to convert one or more of the real-time performance data, analyzed data and field performance data to a mainframe format; and instructions to send the converted data to the mainframe in a backend system.

In another aspect, the computer program includes instructions to determine a node in the backend system that is associated with a trouble ticket for the digital subscriber line and instructions to send the data directly to the node. The computer program also may include instructions to identify at least one faulty operation indicator with respect to the digital subscriber line that is one of a: bridged tap fault; single frequency interference fault; and disturber circuit fault.

In another aspect, the disclosure provides a method that includes: receiving an identifier corresponding to a digital subscriber line from a user device over wireless network; mapping the identifier to a port address for a switch in communication with the digital subscriber line; sending an interrogation request to the port address of the switch to interrogate the digital subscriber line; collecting real-time performance data of the digital subscriber line at a network end of the digital subscriber line in response to the interrogation request; converting the raw performance data to analyzed performance data; and sending the analyzed data to the user device over the wireless network. In the method, a web portal is sent to the user device and the identifier is received via the web portal. In the method, the field performance data is received via the web portal. The analyzed data and the field performance data of the digital subscriber line are sent to a backend system for storage corresponding to trouble ticket associated with the digital subscriber line. The method utilizes a web-based system for collecting the real-time performance data, analyzing the data, and converts the web-based data to mainframe format and then sends the converted data to the backend system. In one aspect, a node associated with the backend system that corresponds to the identifier is determined and the data is sent directly to the node for storage and handling corresponding to a trouble ticket associated with the line.

In another aspect of the method, the identifier received via a web browser interface is provided by a gateway server and wherein the identifier is mapped to the port address by a broadband server responsive to the gateway server. The port address is to a regional server that sends a data request to a network equipment management system coupled to a switch.

In another aspect, the disclosure provides system that includes a first server that maintains trouble ticket data corresponding a plurality of communication lines corresponding a separate identifier for each communication line in the plurality of lines, each line in the plurality of lines providing network content to customer premises equipment; and a second server that receives an identifier from a particular communication line from the plurality of lines from a remote user and wherein the web server initiates interrogation of the particular communications lines in response to receiving the identifier; receives performance data relating to the interrogation of the particular line; receives filed test data from the user relating to the particular communications line; and converts at least one of the field performance data and the performance data relating to the interrogation from a web based format to a mainframe format and transmits the converted data to the first server corresponding to a trouble ticket associated with the particular communication line.

Figure 7:
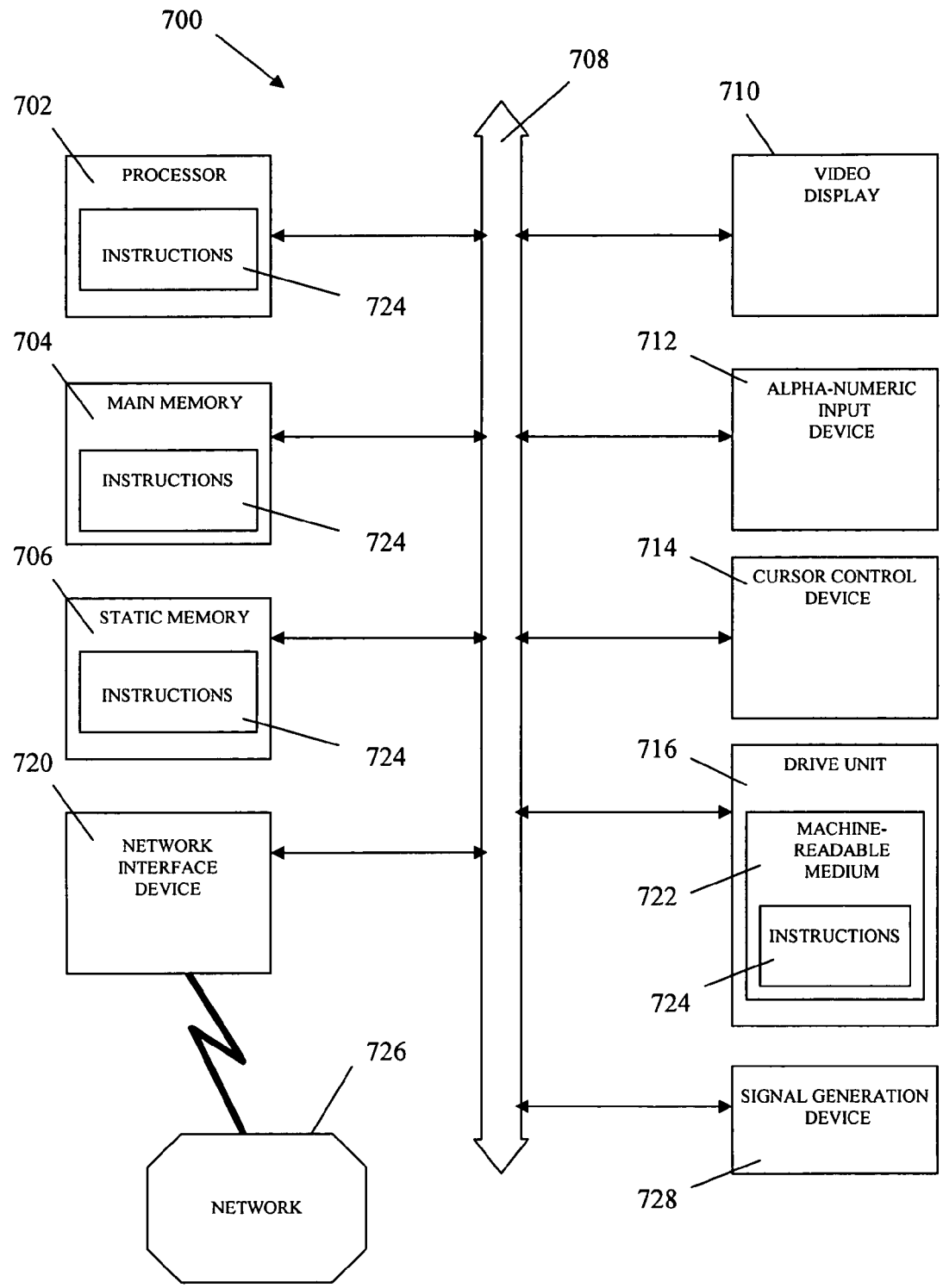
FIG. 7 is a diagrammatic representation of a machine in the form of a computer system within which a set of instructions, when executed, may cause the machine to perform any one or more of the methodologies discussed herein.

FIG. 7 is a diagrammatic representation of a machine in the form of a computer system 700 within which a set of instructions, when executed, may cause the machine to perform any one or more of the methodologies discussed herein, including specifying initial settings, changes made to the settings via a customer premise equipment, such as an STB and/or a remote device over the Internet or another suitable network, and updating the changes on to the STB and the network databases. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for accessing digital subscriber line performance data, the method comprising:
   receiving an identifier corresponding to a digital subscriber line from a user device over wireless network;
   mapping the identifier to a port address for a switch in communication with the digital subscriber line;
   sending an interrogation request to the port address of the switch to interrogate the digital subscriber line;
   collecting real-time performance data of the digital subscriber line at a network end of the digital subscriber line in response to the interrogation request;
   converting the real-time performance data to analyzed performance data; and
   sending the analyzed data to the user device over the wireless network.

2. The method of claim 1 further comprising sending a web portal to the user device, and receiving the identifier as an input to the web portal.

3. The method of claim 2 further comprising receiving field performance data of the digital subscriber line via the web portal over the wireless network.

4. The method of claim 3 further comprising sending the analyzed data and the field performance data of the digital subscriber line to a backend system for storage corresponding to a trouble ticket associated with the identifier.

5. The method of claim 1 further comprising: using a web-based system for collecting the real-time performance data; converting the web-based data to mainframe format; and sending the converted data to a backend system using an emulator associated with the backend system.

6. The method of claim 5 further comprising determining a node associated with the backend system that corresponds to the identifier and storing the field performance data in a database associated with the node.

7. The method of claim 1 further comprising processing the real-time performance data to identify at least one faulty operation indicator with respect to the digital subscriber line that is one of a: bridged tap fault; single frequency interference fault; and disturber circuit fault.

8. The method of claim 1, wherein the identifier is received via a web browser interface provided by a gateway server and wherein the identifier is mapped to the port address by a broadband server responsive to the gateway server.

9. The method of claim 8, further comprising communicating the port number to a regional server.

10. The method of claim 9, further comprising sending a data request from the regional server to a network equipment management system coupled to the switch.

11. The method of claim 8 wherein the broadband server has an extensible markup language interface to an application client server.

12. The method of claim 1, further comprising creating a log file to record historical trouble events and comments, the log file accessible to a plurality of operational personnel working groups.

13. A system, comprising:
   a first server that maintains trouble ticket data corresponding a plurality of communication lines corresponding to a separate identifier for each communication line in the plurality of lines, each line in the plurality of lines providing network content to customer premises equipment; and
   a second server that receives an identifier for a particular communication line in the plurality of lines from a user device and wherein the second server:
      initiates interrogation of the particular communications lines in response to receiving the identifier;
      receives performance data relating to the interrogation of the particular line;
      receives filed test data from the remote user device relating to the particular communications line; and
      converts at least one of the field performance data and the performance data relating to the interrogation from a web based format to a mainframe format and transmits the converted data to the first server corresponding to a trouble ticket associated with the particular communication line.

14. The system of claim 13, wherein the user sends the identifier and the field data over a wireless connection.

15. The system of claim 13, wherein the performance data relating to the interrogation relates to a real-time test performed at a network end of the particular communication line.

16. The system of claim 15, wherein the real-time test is performed using a digital subscriber line access multiplexer coupled to the particular communications line.

* * * * *